United States Patent [19]

Callaghan

[11] 4,098,377
[45] Jul. 4, 1978

[54] SYNCHRONIZED CREEP AND BRAKE CONTROL

[75] Inventor: William I. Callaghan, Mentor, Ohio

[73] Assignee: Towmotor Corporation, Mentor, Ohio

[21] Appl. No.: 785,796

[22] Filed: Apr. 8, 1977

[51] Int. Cl.² ............ B60K 41/24; F16D 67/02
[52] U.S. Cl. ................ 192/13 R; 60/486; 91/412
[58] Field of Search ............ 192/13 R, 4 R; 91/412; 60/486

[56] References Cited

U.S. PATENT DOCUMENTS

| | | | |
|---|---|---|---|
| 3,381,783 | 5/1968 | Brukner | 192/13 R X |
| 3,498,427 | 3/1970 | Bingley | 192/13 R |
| 3,844,121 | 10/1974 | Griesenbrock | 60/562 |

*Primary Examiner*—Edgar W. Geoghegan
*Attorney, Agent, or Firm*—Phillips, Moore, Weissenberger, Lempio & Majestic

[57] ABSTRACT

Hydraulic brake and clutch apparatus includes a master cylinder for applying pressure to a brake past a sequence valve, such pressure also being applied to move another valve against a spring from a position wherein a pump applies fluid pressure to engage a transmission, to a position wherein fluid pressure is dumped from the transmission to provide disengagement thereof.

6 Claims, 1 Drawing Figure

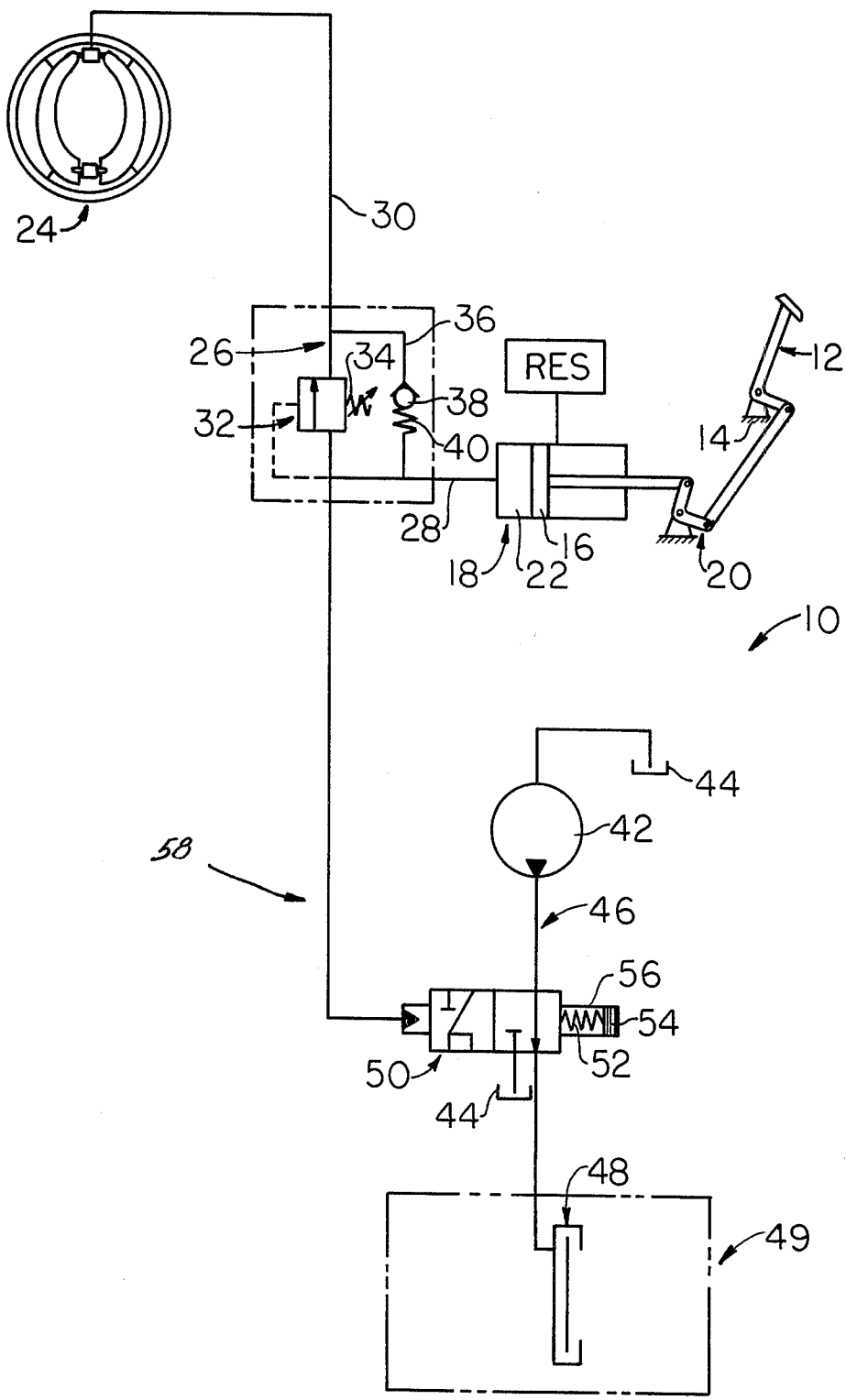

SYNCHRONIZED CREEP AND BRAKE CONTROL

BACKGROUND OF THE INVENTION

This invention relates to hydraulic fluid circuitry, and more particularly, to hydraulic brake and clutch apparatus for providing synchronized interaction thereof. In the operation of a vehicle which includes brakes actuatable upon application of hydraulic fluid pressure thereto, and releasable upon release of fluid pressure therefrom, and torque converter means including clutch means engageable upon application of fluid pressure thereto and disengageable upon release of fluid pressure therefrom, it is desirable to provide a synchronization of operation of the brakes with operation of the clutch means, preferably through use of a single pedal movable by the operator of the vehicle, to provide a desired amount of overlap of operation between the brakes and clutch means. This in turn will allow the operator of the vehicle to achieve "creep" control of the vehicle, so that the slow movement of the vehicle is controlled in a highly efficient manner.

SUMMARY OF THE INVENTION

The present invention is directed to overcoming one or more of the problems as set forth above.

According to the present invention, hydraulic brake and transmission apparatus comprise hydraulically actuated brake means, and hydraulic actuating means. First conduit means interconnect the brake means and cylinder means and include first valve means, allowing hydraulic fluid flow from the cylinder means to the brake means, but blocking hydraulic flow from the brake means to the cylinder means. First resilient spring means bias the first valve means in a closed position, allowing hydraulic fluid flow therethrough upon sufficient fluid pressure buildup in the cylinder means. A branch conduit is included, in turn including second valve means allowing hydraulic fluid flow from the brake means to the cylinder means, but blocking hydraulic fluid flow from the cylinder means to the brake means. Further included are a source of fluid pressure and hydraulic transmission means engageable upon application of fluid pressure thereto and releasable upon release of fluid pressure therefrom. Second conduit means interconnect the source and transmission means and include variable valve means movable between relatively open and relatively closed positions thus providing relatively greater or less fluid pressure being applied to the transmission means from the source. Second resilient spring means bias the variable valve means toward its open position, and third conduit means communicate with the first conduit means on the cylinder means side of the first valve means, and communicate with the variable valve means so that fluid pressure in the third conduit means acts against the resilience of the second resilient spring means and toward a relatively closed position.

BRIEF DESCRIPTION OF THE DRAWINGS

Other objects of the invention will become apparent from the study of the following specification and drawing, which is a schematic view of a hydraulic system incorporating the present invention.

DESCRIPTION OF THE PREFERRED EMBODIMENT

Shown in the drawing is the overall hydraulic brake and clutch apparatus 10. Such apparatus includes a pedal 12 pivotally mounted relative to the frame 14 of a vehicle (not shown) and movable to actuate the piston 16 of a master cylinder 18 through a linkage 20 to selectively build up pressure in a chamber 22 of the master cylinder 18, or lower the pressure in that chamber 22. Such overall structure including the master cylinder 18 acts as hydraulic actuating means, as will be further described.

Further included are the brakes 24 (one shown) of the vehicle, which are hydraulically actuated upon application of fluid pressure thereto and releasable upon release of fluid pressure therefrom. First conduit means 26, including conduit 28 and conduit 30, interconnect the brake 24 and the master cylinder 18. A sequence valve 32 is included in the conduit 30 of the conduit means 26, such valve 32 allowing hydraulic fluid flow from the master cylinder 18 to the brake 24, but blocking hydraulic fluid flow from the brake 24 to the master cylinder 18. An adjustable resilient spring 34 is operatively associated with the sequence valve 32, biasing the valve 32 to a closed position. However, upon sufficient pressure buildup in the cylinder 18 and the conduit 28, the valve 32 will be forced open against the spring 34, allowing hydraulic fluid flow therethrough.

A branch conduit 36 is connected in parallel with the conduit means 26, on the upstream side of the valve 32. The branch conduit 36 communicates with the conduit 28 and the conduit 30, and includes a check valve 38. Such check valve 38 allows hydraulic fluid flow from the brake 24 to the cylinder 18, but blocks hydraulic fluid flow from the master cylinder 18 to the brake 24. A spring 40 is also operatively associated with the check valve 38, tending to bias the check valve 38 to a closed position.

A hydraulic fluid pump 42 draws fluid from a reservoir 44, and communicates such fluid to conduit means 46 interconnecting the pump 42 and clutch means 48 of a torque converter transmission 49. The clutch means 48 is of the type wherein application of fluid pressure thereto engages the clutch means 48 while release of fluid pressure therefrom provides disengagement of the clutch means 48. The conduit means 46 includes an infinitely variable valve 50, movable between relatively open and relatively closed positions for providing relatively greater or less fluid pressure to be applied to the clutch means 48 from the pump means 42. The valve 50 is shown in its open position, but can be moved rightwardly to provide relatively more and more closing thereof, applying less and less fluid pressure to the clutch means 48, meanwhile dumping more and more pressure from the pump 42 to the tank 44.

Resilient spring means 52 biases the infinitely variable valve 50 towards its open position. The force of such resilient spring means 52 is adjustable by means of shins 54 in a housing 56.

Conduit means 58 communicate with the conduit means 26 on the cylinder side of the valve 32. Such conduit means 58 also communicate with the infinitely variable valve 50 so that fluid pressure in the conduit means 58 tends to urge the infinitely variable valve 50 against the resilience of the spring 52 toward a relatively closed position.

In operation, with the apparatus 10 as shown in the drawing, the pump 42 supplies fluid pressure to the clutch means 48 to engage the clutch means 48 of the torque converter transmission 49. Meanwhile, the pedal 12 is in an unactuated state, so that pressure buildup does not exist in the conduit means 26. The brakes 24 of the vehicle are therefore not applied. Upon pivoting of the pedal 12 in a counterclockwise direction, pressure is built up in the chamber 22 and conduit 28 until it is sufficient to overcome the bias of the spring 34, whereupon fluid pressure is applied to the brakes 24 to apply the brakes 24 of the vehicle. Meanwhile, the check valve 38 blocks fluid flow therethrough.

Simultaneously, fluid pressure is built up in the conduit means 58 and is applied to the valve 50 to move the infinitely variable valve 50 rightwardly against the bias of the spring 52. Thus, while the pedal 12 is moved counterclockwise, less and less fluid pressure is applied to the clutch means 48 to provide a greater and greater degree of disengagement of the clutch means 48 during actuation of the brakes 24. It will therefore be seen that the disengagement of the clutch means 48 and engagement of the brakes 24 are synchronized to provide proper interaction of the two for creep control of the vehicle. In fact, as set forth above, the force of spring 52 on the valve 50 may be adjusted, and the spring 34 is also adjustable so that both the spring 52 and spring 34 are adjustable. Thus, a wide variety of clutch pressures may be obtained as chosen before the brakes are applied, depending upon the adjustment of spring 34 and the adjustment of the spring 52. The degree of "overlap" of the brake 24 and clutch means 48 of the vehicle may be chosen, so that the operator may provide "creep"]control through convenient actuation of a single pedal 12. In particular, it has been found advantageous to provide that the infinitely variable valve 50 is moved to an extent from its open to its closed position prior to opening of the valve 32 against the bias of the spring 34, to provide a degree of disengagement of the clutch means 48 prior to any engagement of the brakes.

The sequence valve 32 maintains a predetermined amount of pressure in line 58 upon application of the brakes 24, thereby preventing a possible inrush of pressurized fluid to the brakes 24, which could cause a pressure drop in conduit 58, which would be sensed by valve 50. This would undesirably affect the position of the valve 50. However, with inclusion of the sequence valve 32, proper pressure in conduit 58 in this condition is maintained.

The embodiments of the invention in which an exclusive property or privilege is claimed are defined as follows:

1. Hydraulic brake and transmission apparatus comprising:
   hydraulically actuated brake means;
   hydraulic cylinder means;
   first conduit means interconnecting the brake means and cylinder means and including first valve means allowing hydraulic fluid flow from the cylinder means to the brake means, but blocking hydraulic fluid flow from the brake means to the cylinder means;
   first resilient spring means biasing the first valve means to a closed position, but allowing hydraulic fluid flow therethrough upon sufficient fluid pressure buildup in the cylinder means;
   a branch conduit in parallel with the first conduit means and including second valve means allowing hydraulic fluid flow from the brake means to the cylinder means, but blocking hydraulic fluid flow from the cylinder means to the brake means;
   a source of pressurized fluid;
   hydraulic transmission means engageable upon application of fluid pressure thereto and disengageable upon release of fluid pressure therefrom;
   second conduit means interconnecting the source and transmission means and including infinitely variable valve means movable between relatively open and relatively closed positions for providing relatively greater or less fluid pressure being applied to the transmission means from the source;
   second resilient spring means for biasing the infinitely variable valve means toward its open position; and
   third conduit means communicating with the first conduit means on the cylinder means side of the first valve means, and communicating with operating means for the infinitely variable valve means, so that fluid pressure in the third conduit means tends to urge the infinitely variable valve means against the resilience of the second resilient spring means toward a relatively closed position.

2. The apparatus of claim 1 wherein the first valve means comprises a sequence valve and wherein the second valve means comprises a check valve.

3. The apparatus of claim 2 wherein the transmission means comprises clutch means.

4. The apparatus of claim 1 wherein the second resilient spring means comprises adjustable spring means.

5. The apparatus of claim 4 wherein the first resilient spring means comprises adjustable spring means.

6. The apparatus of claim 1 wherein the first and second spring means provide that the infinitely variable valve means is moved to an extent from its open toward its closed position prior to opening of the first valve means against the bias of the first resilient spring means.

* * * * *